United States Patent
Garfield et al.

(10) Patent No.: US 7,084,201 B2
(45) Date of Patent: Aug. 1, 2006

(54) NON-FLAMMABLE WATERPROOFING COMPOSITION

(75) Inventors: Michael Garfield, Mentor, OH (US); Paul E. Marshall, Jr., Creston, OH (US)

(73) Assignee: Wall-Guard Corporation of Ohio, Smithville, OH (US)

( * ) Notice: Subject to any disclaimer, the term of this patent is extended or adjusted under 35 U.S.C. 154(b) by 66 days.

(21) Appl. No.: 10/713,516

(22) Filed: Nov. 14, 2003

(65) Prior Publication Data

US 2005/0107514 A1    May 19, 2005

(51) Int. Cl.
*C08L 25/10* (2006.01)
*C08L 9/06* (2006.01)
*C08K 5/02* (2006.01)
*B32B 27/24* (2006.01)

(52) U.S. Cl. .............. 524/575; 524/571; 524/573; 524/470; 524/464; 524/481; 524/484; 524/490; 524/430; 524/437; 428/500

(58) Field of Classification Search ........... 524/490, 524/492, 575, 464, 474, 571, 573, 470, 481, 524/484, 430, 437; 525/95, 98; 427/385.5, 427/393.6; 428/355 R, 355 BL, 500
See application file for complete search history.

(56) References Cited

U.S. PATENT DOCUMENTS

| | | | | |
|---|---|---|---|---|
| 3,577,398 A | | 5/1971 | Pace, et al. .............. 260/85.3 |
| 4,011,178 A | * | 3/1977 | Muse ......................... 524/356 |
| 4,042,554 A | * | 8/1977 | Poskitt ...................... 523/337 |
| 4,515,992 A | * | 5/1985 | Gupta ..................... 174/102 R |
| 4,654,398 A | * | 3/1987 | McFadden ................. 524/512 |
| 4,853,069 A | * | 8/1989 | Williams et al. ........... 156/401 |
| 4,970,242 A | * | 11/1990 | Lehman ...................... 521/78 |
| 5,177,163 A | * | 1/1993 | Chu et al. .................... 526/76 |
| 5,352,531 A | | 10/1994 | Roberts et al. ............. 428/446 |
| 5,534,303 A | | 7/1996 | Roberts et al. ............. 524/476 |
| 5,534,583 A | | 7/1996 | Roberts et al. .......... 427/385.5 |
| 5,610,239 A | * | 3/1997 | Skelley ..................... 525/331.7 |
| 5,804,635 A | | 9/1998 | Roberts ..................... 524/476 |
| 5,807,638 A | | 9/1998 | Roberts ..................... 428/451 |
| 5,925,706 A | | 7/1999 | Roberts ..................... 524/476 |
| 5,932,646 A | | 8/1999 | Roberts ..................... 524/476 |
| 6,025,032 A | * | 2/2000 | Gaveske .................. 427/393.6 |

FOREIGN PATENT DOCUMENTS

GB    2 223 023 A   *   3/1990

* cited by examiner

*Primary Examiner*—David W. Wu
*Assistant Examiner*—Rip A. Lee
(74) *Attorney, Agent, or Firm*—Hahn Loeser & Parks, LLP; W. Edward Crooks

(57) ABSTRACT

A composition of matter and a solvent system for use in providing a water resistant coating to basement walls is disclosed. The solvent system comprises a chlorinated solvent blend. The solvent system and coating composition have no flash point, are non-flammable and provide an improved consistent coating when applied to walls.

28 Claims, No Drawings

NON-FLAMMABLE WATERPROOFING COMPOSITION

TECHNICAL FIELD

The present invention relates to protective coatings for basement walls and more particularly it relates to polymer and rubber based materials in a solvent solution adapted to be applied to the walls. The coating solution of the present invention has no flash point and is non-flammable.

BACKGROUND OF THE INVENTION

Basement and foundation waterproofing is a critical aspect of the construction of new buildings. The waterproofing process generally involves applying a composition to a wall to impart water resistant properties. Prior art coatings included asphalts dissolved in a solvent which are sprayed onto a wall. It is common to apply a protective board over the coating for facilitating water drainage and/or providing additional insulation.

In addition to superior water resistant characteristics, good basement wall coatings require a variety of properties in order to be considered satisfactory. They should be strong, have good elasticity, and be able to be applied uniformly to the surface of a wall. While asphalt based compositions have performed satisfactorily, polymer based compositions are also particularly useful for waterproofing. Since polymer based coatings usually have more than one solid ingredient in the formulation, it is important that all ingredients be chemically compatible to avoid separation of the polymer components from the solution resulting in loss of the desirable properties of the solution. Such separation can cause loss of elasticity, strength, tack, and water resistance.

In many waterproofing applications it is generally preferred to apply a protective board while the coating is still wet. In some cases, however, this is not possible. Therefore, it is desirable for the coating to maintain aggressive residual tack, even when the coating is dry. Without sufficient tack, the waterproofer must often resort to mechanical fasteners such as nails to hold the protective board to the wall. Such mechanical fasteners put holes in the coating, jeopardizing its waterproofing ability.

When using a coating comprised of polymeric materials, it is important that there be a proper physicochemical interaction between the polymers and the solvent. The solvent must be able to dissolve the various polymers as well as impart additional characteristics to the composition as a whole. Such properties are unique to the solvent system itself as will be explained herein.

A satisfactory coating should also provide a consistent, uniform coating on the wall. The solvent is believed to be related to the consistency of the coating applied to the wall. Coating that runs down the wall during application may lead to weak spots in the coating. The solvent also affects the drying rate of the coating. When the prior art coatings cure too quickly due to factors such as elevated temperatures or exposure to sunlight, trapped air may cause pinholes in the coating surface, as the air escapes from the coating. The rupturing of such pin holes also leads to weak spots in the coating. Therefore, there is a need in the prior art for a solvent system, which eliminates aeration and allows for the release of trapped air from the coating irrespective of the rate at which the coating dries.

Solvent systems used in prior art coatings are generally highly explosive and flammable. For example, U.S. Pat. No. 5,352,531 to Roberts recommends using combinations of an aliphatic petroleum distillate, such as LACOLENE sold by Ashland Chemical Company, and toluene. Such a solvent has a flash point of about 18° F. As another example, U.S. Pat. No. 5,932,646 to Roberts uses a solvent that is a blend of petroleum distillates, preferably naphthenic distillates, and heptane. A solvent recommended in this patent is sold by UNOCAL under the name Lactol Spirits. This solvent has a flash point of about 17° F. As a result of the extremely low flash points, solutions including these solvents are highly explosive. Thus, they are very dangerous to use as the slightest spark may ignite the vapors around the material. Chlorinated organic solvents have not previously been used in waterproofing applications, likely because their use was believed to be cost prohibitive.

In addition, the prior art compositions exhibited a very low viscosity at spraying temperatures making sag and run down more likely until the material cooled and began to dry. Waterproofing compositions that have a lower viscosity at spraying temperature also require the application of more coats of the composition to achieve the desired thickness of the waterproofing material.

Thus, a need exists for a improved solvent system for use in waterproofing applications, which is capable of dissolving polymer based waterproofing compositions to allow them to be sprayed on a wall, but is non-explosive and nonflammable. A need also exists for a waterproofing solution that exhibits improved drying and curing characteristics and which can be used with or without a protective board or film over the sprayed waterproofing composition.

SUMMARY OF THE INVENTION

In accordance with the present invention, an elastomeric waterproofing coating is provided that is nonflammable, and that when applied to a wall, will produce a more uniform and consistent coating. The present invention also includes a waterproofed wall, wherein a surface of said wall has been coated with a composition of matter in accordance with the present invention. In addition, the present invention also includes a method of waterproofing a wall by applying a composition of matter to a wall. In one embodiment, the waterproofing method also comprises applying a protective board or film over the surface of the waterproof coating.

In general, the present invention provides a composition of matter for waterproofing a surface comprising about 30% to about 36% by weight of a polymeric base, the polymer base comprised of about 50% of a hydrocarbon resin and about 50% of a copolymer, about 55% to about 70% of a solvent system, comprising a chlorinated organic solvent. The composition may also include up to 9% by weight of coloring agents. The waterproofing composition of the present invention preferably has a viscosity of about 6000 cps to about 14,400 cps at 77° F. and a viscosity of about 2000 cps to about 5600 cps at 140° F.

At least one or more of the foregoing objects of the present invention together with the advantages thereof over the prior art will become apparent from the description of the invention that follows. Exemplary compositions of the coating and methods of applying such coating are described herein by way of example. The specification does not attempt to show all the various forms and modifications in which the present invention might be embodied, rather the invention should be measured by the claims presented herein.

DETAILED DESCRIPTION OF THE INVENTION

The present invention is generally directed to a polymer based waterproofing composition for application to the exterior surface of basement or foundation walls. The waterproofing coating of the present invention is capable of being applied at various ambient temperatures. The coatings are applied by spraying, and to achieve proper spraying properties, it is recommended to heat the solution to between about 105° F. to about 160° F., preferably between about 120° F. to about 140° F. It is preferred that an airless spray be employed to apply the coating. An example of a suitable technique is to use a Graco 733 airless sprayer, using between about 2,500 psi and about 4,000 psi.

The coating itself is a mixture of a hydrocarbon resin and a block copolymer dissolved in a chlorinated organic solvent. The block copolymers are generally selected from the group consisting of styrene-isoprene-styrene block copolymers, styrene-butadiene-styrene block copolymers, or styrene-ethylene/butylene-styrene block copolymers. It is contemplated that other block copolymers with sufficient waterproofing characteristics may also be used without departing from the scope of the present invention.

The block copolymers or rubber compositions employed in the present invention are well-known in the art and are commercially available. In general, the molecular weight of the polymers used is not critical. Typically the molecular weight of suitable polymers will be in the range of about 60,000 to about 180,000. In addition, the styrene content, the isoprene content, the butadiene content, the ethylene content, and/or the butylenes content is not critical. Typically, the styrene content will be between about 10% to 35% by weight. Suitable materials are available under the trademark KRATON™ and are supplied by Kraton Polymers.

Hydrocarbon resins as used in the present invention are also commercially available. The hydrocarbon resin may be selected from polyterpene resins or petroleum hydrocarbon resins. Polyterpene resins are typically formed by the polymerization of $C_{10}H_{16}$ monomers, such as alpha-pinene, beta-pinene, limonene, dipentene, beta-phellandrene, myrcene, 3-carene, camphene and terpinolene. The hydrocarbon resin may also be a petroleum resin meaning a resin that is produced by the polymerization of cracked petroleum distillates. Such hydrocarbon resins can be formed by polymerizing aliphatic olefins and diolefins having four to six carbon atoms. Typically the olefins and diolefins consist primarily of monomers having five carbon atoms. Most desirably the hydrocarbon resin will be provided with some aromaticity. The aromaticity can be provided by polymerizing the monomers in the presence of styrene or an alpha-methyl styrene. Less suitably, the styrene and alpha-methyl styrene can be separately polymerized and blended in with the $C_4$–$C_6$ polymerized resin. Exemplary formulations can be found in U.S. Pat. No. 3,577,398. Such hydrocarbon resins are solid at room temperature. Representative monomers include isoamylene (2,2 dimethyl-a propene), piperylene (1,3 pentadiene, isoprene (2-methyl-1,3 butadiene), 2 methyl-1 butene and 2 methyl-2 butene. Typically the hydrocarbon resins have softening points in excess of about 140° F. or 158° F. (60° C. or 70° C.) and usually in the range of about 140° F. (60° C.) to about 356° F. (180° C.). Most desirably, they have softening points in the range from about 176° F. (80° C.) to about 230° F. (110° C.).

Commercially available hydrocarbon resins suitable for use in the present invention include PICCOTAC™ 1095 resin and REAGALREZ™ 1094 resin both available from Eastman resins. PICCOTAC™ 1095 is an aliphatic C5 resin, which has a narrow molecular weight distribution. REAGALREZ™ 1094 resin is a hydrocarbon resin that is produced by polymerization and hydrogenation of pure monomer hydrocarbon feedstocks. Also suitable is a resin sold under the trademark WINGTACK by Good Year Chemical. In one embodiment of the present invention, a resin sold as WINGTACK™ 86 is specifically suitable. WINGTACK™ 86 resin is an aromatically modified C5 hydrocarbon resin. Resins similarly prepared or having similar characteristics are considered suitable and within the scope of the present invention. Other commercially available resins may also be used without departing from the scope of the present invention.

The solvent system employed for the present invention comprises a chlorinated organic solvent. Chlorinated organic solvents that can be used in the present invention include, but are not limited to, methylene chloride, ethylene tetrachloride, ethylene trichloride, ethane trichloride, trichloromethane, carbon tetrachloride, and chloroacetyl chloride. In one preferred embodiment, the solvent system includes a chlorinated organic solvent with the chemical formula $C_2Cl_4$, which is commonly referred to as ethylene tetrachloride. Ethylene tetrachloride is sometimes also referred to as perchlor, tetrachloroethylene, and perchloroethylene. Perchlor solvent blends are commercially available. In a preferred embodiment, the perchlor blend solvent used has additional agents added including, but not limited to, emulsifiers, wetting agents, solubilizers, and stabilizers. Other ingredients may be added to or removed from the perchlor solvent without departing from the scope of the present invention but are not needed for the beneficial safety advantages of the present invention. In a preferred embodiment of the present invention, a commercially available solvent provided by CHEMSAFE International as Formula 11979 is used.

It is also acceptable and sometimes preferred to add a coloring agent to the waterproofing solution. This can be done to allow the waterproofing composition to match the color of a wall being coated or to contrast with the color of the wall to allow defects in the waterproof coating to be easily visualized. In a preferred embodiment, green or gray pigments are used, although other colors will not depart from the scope of the present invention. Pigments suitable for use in the present invention are commercially available. Examples of acceptable coloring agents include but are not limited to chromium oxide with green pigment and aluminum paste. Suitable coloring agents may be obtained from Landers-Segal Color Company, also known as LANSCO or from Arquimex.

Coating solutions made in accordance the present invention are non-flammable and have no flash point. The solvent system improves the solubility of the polymer mix and is highly stable, showing little separation of the polymers from the solution. In addition, the solvent system provides for better suspension of any pigments or coloring agents added to the solution to provide more consistent color of the coating once it is applied to a wall. After the coating solution is applied to a wall, the solvent system evaporates leaving a water impervious, elastomeric coating on the wall. As the coating solution of the present invention dries, it exhibits little to no aeration. The improved release of trapped air to the surface of the coating provides a coating without pinholes or blisters which lead to weak spots in the coating. Solutions in accordance with the present invention exhibited improved coating capabilities over the prior art resulting in less sag and run down. Finally, in some embodiments of the present invention, the coating exhibits improved adhesion and tack characteristics to facilitate installation of insulation or drainage boards overtop of the coating.

EXAMPLE I

A composition of the present invention was made by mixing the following ingredients at the following concentrations:

TABLE I

| Ingredient | Amount (pounds) |
|---|---|
| CHEMSAFE International Formula 11979 | 5.5 |
| Piccotac Resin | 1.6 |
| KRATON D1107 | 1.6 |
| Green Pigment Chromium Oxide (Landers-Segal Company) | 0.3 |

This coating had a viscosity of 14,400 cps at 77° F. and 5600 cps at 140° F. and exhibited superior properties for applying the coating to basement walls. The coating provided a uniformly thick coat, with limited sag and rundown. It also dried with substantially no aeration as the solvent evaporated resulting in a coating substantially without pinholes or weak spots in the coating. This coating also exhibited very aggressive residual tack to facilitate the placement of a protective board over the coating.

EXAMPLE II

Another composition of the present invention was made by combining the following ingredients:

TABLE II

| Ingredient | Amount (pounds) |
|---|---|
| CHEMSAFE International Formula 11979 | 6.0 |
| WINGTACK 86 resin | 1.6 |
| KRATON D1102 | 1.6 |
| Green Pigment Chromium Oxide (Landers-Segal Company) | 0.3 |

This composition also exhibited improved coating, spraying and drying characteristics as described herein. A coating made by the above formulation dried with residual tack for approximately 24 hours. After that time, the tack subsided, and the coating was able to be left without protective board while still exhibiting suitable waterproofing capabilities.

Another coating suitable for application in the roof restoration market may be made by combining ingredients in accordance with the present invention:

TABLE III

| Ingredient | Amount (pounds) |
|---|---|
| CHEMSAFE International Formula 11979 | 6.5 |
| Regalrez resin | 1.6 |
| KRATON G1652 | 1.6 |
| Aluminum paste (Arquimex Company) | 0.3 |

A coating made according to the above formulation may be used for metal roof restoration, for the repair of rubber roofs or for other waterproofing applications.

To invention has been described with respect to several preferred embodiments. This description is not intended as a limitation; other modifications or variations in the specific form shown and described will be apparent to those skilled in the art and will fall within the spirit of the invention and the scope of the following claims.

What is claimed is:

1. A composition of matter for waterproofing a surface of a wall, said composition comprising:
   an aromatically modified C5 hydrocarbon resin;
   a rubber composition, wherein said rubber composition is selected from the group consisting of styrene-isoprene-styrene block copolymers, styrene-butadiene-styrene block copolymers, and styrene-ethylene/butylene-styrene block copolymers; and
   a non-flammable solvent system including at least one chlorinated organic solvent.

2. The composition of matter as recited in claim 1, wherein said hydrocarbon resin is a petroleum hydrocarbon resin.

3. The composition of matter as recited in claim 1, wherein said hydrocarbon resin is a polyterpene resin.

4. The composition of matter as recited in claim 1, wherein said at least one chlorinated organic solvent is selected from the group consisting of methylene chloride, ethylene tetrachloride, ethylene trichloride, ethane trichloride, trichloromethane, carbon tetrachloride, and chloroacetyl chloride.

5. The composition of matter as recited in claim 1, wherein said at least one chlorinated organic solvent is ethylene tetrachloride.

6. The composition of matter as recited in claim 1, further comprising a pigment.

7. The composition of matter as recited in claim 1 wherein said solvent system comprises a perchlor blend, said perchlor blend comprising perchloroethylene and additives selected from the group consisting of wetting agents, emulsifying agents, solubilizing agents, stabilizing agents and combinations thereof.

8. The composition of matter as recited in claim 1 wherein said composition has a viscosity of about 6,000 cps to about 15,000 cps at 77° F.

9. The composition of matter as recited in claim 1 wherein said composition has a viscosity of about 2,000 cps to about 6,000 cps at 140° F.

10. The composition of matter as recited in claim 1 wherein said composition has a viscosity of about 14,400 cps at 77° F. and about 5,600 cps at 140° F.

11. The composition of matter as recited in claim 1 wherein said solvent system has no flash point.

12. The composition of matter as recited in claim 1, wherein said hydrocarbon resin comprises:
    an aliphatic C5 resin.

13. The composition of matter recited in claim 1, wherein said rubber composition comprises a styrene-isoprene-styrene block copolymer.

14. The composition of matter as recited in claim 13 further comprising green chromium oxide pigment dissolved in said solvent system.

15. The composition of matter as recited in claim 1, wherein said solvent system comprises about 55% to about 70% of the total weight of said composition.

16. The composition of matter as recited in claim 1, wherein said resin comprises about 15% to about 18% of the total weight of said composition.

17. The solution as recited in claim 1, wherein said rubber composition comprises about 15% to about 18% of the total weight of said solution.

18. The composition of matter as recited in claim 1, wherein said rubber composition comprises:
a styrene-butadiene-styrene block copolymer.

19. The composition of matter as recited in claim 1, wherein said hydrocarbon resin is produced by polymerizing and hydrogenating a pure monomer hydrocarbon.

20. The composition of matter as recited in claim 1, wherein said rubber composition comprises a styrene-ethylene/butylene-styrene block copolymer.

21. The composition of matter as recited in claim 1, further comprising aluminum paste dissolved in said solvent system.

22. A solution for coating a surface comprising a polymer based waterproofing composition including an aromatically modified C5 hydrocarbon resin and a styrene-ethylene/butylene-styrene block copolymer dissolved in a non-flammable solvent system including at least one chlorinated organic solvent.

23. A composition of matter for waterproofing a surface of a wall, said composition of matter comprising:
an aromatically modified C5 hydrocarbon resin;
a block copolymer selected from the group consisting of styrene-isoprene-styrene block copolymers, styrene-butadiene-styrene block copolymers, and styrene-ethylene/butylene-styrene block copolymers and mixtures thereof; and
a solvent system comprising about 80% to about 99% of ethylene tetrachloride,
wherein said composition is non-flammable.

24. The composition of matter as recited in claim 23, wherein the block copolymer is a styrene-butadiene-styrene block copolymer.

25. The composition of matter as recited in claim 23, wherein the block copolymer is a styrene-isoprene-styrene block copolymer.

26. The composition of matter as recited in claim 23, wherein the block copolymer is a styrene-ethylene/butylene-styrene block copolymer.

27. A waterproofed wall having an interior surface and an exterior surface, said wall comprising:
a continuous, spray coated, water impervious coating disposed on at least one surface, said coating comprising:
an aromatically modified C5 hydrocarbon resin and a rubber composition,
said coating produced by mixing said hydrocarbon resin and said rubber with a non-flammable solvent system comprising a chlorinated organic solvent in an amount sufficient to provide a homogeneous solution having a viscosity of about 6000 cps to about 14,400 cps at 77° F., spraying said solution onto at least one surface of the wall, and thereafter evaporating the solvent system.

28. A method of coating an exterior surface of a wall, said method comprising the steps of:
preparing a coating solution comprising an aromatically modified C5 hydrocarbon resin, a rubber, and a pigment, and a non-flammable chlorinated organic solvent system, wherein the solution has a viscosity of about 6000 cps to about 14,400 cps at 77° F. and about 2000 cps to about 5600 cps at 140° F.;
spraying said solution on a surface of a wall; and
evaporating the solvents to provide a continuous, impervious elastomeric coating on said surface.

* * * * *